Oct. 23, 1934. G. B. SHANKLIN 1,978,233
PRESSURE RESERVOIR FOR CABLES
Original Filed Oct. 4, 1928
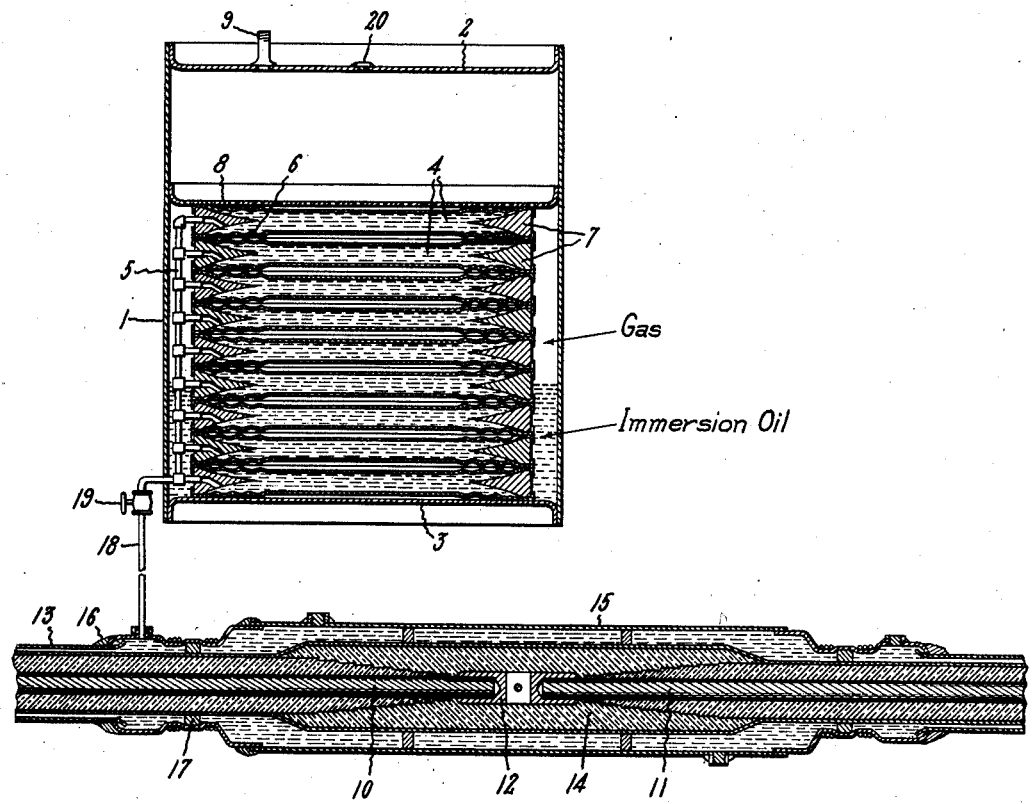
Inventor:
George B. Shanklin,
by Charles E. Muller
His Attorney Patented Oct. 23, 1934

1,978,233

UNITED STATES PATENT OFFICE 1,978,233

PRESSURE RESERVOIR FOR CABLES

George B. Shanklin, Schenectady, N. Y., assignor to General Electric Company, a corporation of New York Original application October 4, 1928, Serial No. 310,398, now Patent No. 1,933,347, dated October 31, 1933. Divided and this application December 22, 1932, Serial No. 648,453

6 Claims. (Cl. 137—71)

The present invention relates to reservoirs for fluid filled cables and is a division of my copending application Serial No. 310,398 filed October 4, 1928 which issued as United States Patent No. 1,933,347 on October 31, 1933.

With fluid filled cable systems of the character having one or more insulated conductors located within an impermeable enclosure which is filled with an insulating liquid, such as degasified oil for example, it is necessary to provide liquid containing reservoirs which are connected to the interior of the enclosure at spaced intervals along its length to receive liquid from and return it to the cable as the load on the latter changes. When the cable system operates on the balanced pressure plan as set forth in the aforesaid application, it is necessary to establish and to maintain determined initial pressures in all of the reservoirs, which pressures differ with departure of the cable from a horizontal position. Furthermore, the pressure of the liquid within the cable should not fall below a determined minimum value, as that of the atmosphere, for if it does injurious voids will be formed. On the other hand, the pressure should not rise above a determined maximum value because of possible injury to the external covering or enclosure due to stretching thereof. As a result of the limitations imposed by the cable requirements, the reservoirs have to be extremely sensitive to pressure changes while on the other hand, they must be capable of operating for years within the determined pressure range without failure. It is evident that cable installations operating on the balanced pressure plan will differ one from the other, sometimes the differences will be small and in other cases large due to differences of elevation, length of cable to be serviced by individual reservoirs, etc. This may and usually does call for reservoirs having different cubical contents and operating at different pressures. It is evident that to make as many different sizes of reservoirs as there are different conditions met with in practice would be economically prohibitive. As a practical matter, only a limited number of different sizes of reservoirs can be profitably made, and only in very few instances if any will the reservoir be exactly what is desired for a particular point in an installation.

It has been proposed, as illustrated in the patent to Emanueli 1,809,927, issued June 16, 1931 to make reservoirs comprising a sealed tank and a plurality of cellular elements located therein, the chambers of said elements being filled with air or gas under atmospheric pressure. Such a reservoir after it is once assembled is incapable of being adjusted either as to volume or pressure and hence has only a limited application. It is impractical to open the casing and change the number of cells, and even if this could be done, the addition or removal of one cell would not afford the required accuracy of adjustment required. Nor is it practical to first open the casing and then open the cells and change the pressure of the gas within them. The demands made on these cells is so exacting in service that it is neither wise nor safe to permit the cable installing force to tamper with them.

It has also been proposed to use bellows as the liquid receiving element and to provide a spring for controlling its movements. Such a construction is open to a number of practical objections, chief among which is the difficulty of designing spring actuated mechanism which has the desired operating characteristics and to the fact that springs deteriorate in service as the metal fatigues. Also the metal forming the bellows is not sufficiently flexible for the purpose hereof, and the fatigue of the metal causes failures thereof. The reservoirs for cables are located in manholes below the level of the street which are usually damp and often contain water, as well as other foreign matter, which would soon cause injury to the springs and other exposed parts.

My invention has for its object the provision of a simple improved form of cable reservoir of substantially universal application which is free of the objections above noted and of which the operating characteristics can be changed at will without opening it.

For a consideration of what I believe to be novel and my invention, attention is directed to the accompanying description and the claims appended thereto.

In the drawing is shown one of my improved reservoirs connected to a semi-stop joint of a liquid filled cable.

The reservoir comprises an outer casing 1 sealed at its two ends by means of heads 2 and 3. Inside of the casing is a structure comprising a plurality of similar cells 4 arranged in axial alignment to form a stack and connected in parallel by a pipe structure 5 to the cable. The walls of the cells are made preferably of very thin metal and are corrugated at 6 to give a near approach to perfect flexibility. The walls are secured at their edges to wedge shaped spacing collars 7 which serve to give mechanical support thereto. The cell structure fills only partially the casing, the remainder being filled with a body of gas under pressure, or with bodies of gas and immersion oil. The walls of each cell are separated by an amount determined by the difference in pressure between the oil within the cells and that of the body of gas within the casing. As the oil pressure increases the walls continue to move outwardly until they are in contact over practically their entire area, thereby affording mechanical support, one cell for the other. On the other hand, as the oil pressure decreases, the external gas pressure causes the walls of each cell to move gradually inwardly toward the collapsed position of the cell. This inward movement first causes a small portion of the surface of the walls to rest on and hence to be supported by the wedge shaped spacers 7, said area of support increasing as the walls continue to approach each other. Later, when fully collapsed, the walls of each cell contact with each other, and thus complete mechanical support is afforded.

From the foregoing, it will be seen that the walls are made of very thin metal, and have great flexibility which implies that of themselves they are incapable of withstanding substantial differences of pressure without rupture. Nevertheless, the arrangement is such that the walls of the cells are fully supported mechanically, both in the expanded and collapsed condition of said cells and that there are no sharp corners or surfaces where the metal of the walls is highly stressed.

In the casing above the upper cell is a perforated wall 8 which acts to limit the upward or outward movement of the upper wall of the top cell. The portion of the casing not filled with the cellular structure is filled with a suitable elastic fluid, such for example as some suitable gas which is put in the casing under pressure greater than that of the atmosphere, so as to establish in the casing and on the walls of the cells a certain initial pressure. At 9 is indicated a suitable filling stem and valve through which such gas may be forced into and retained in the casing 1. With this arrangement, it will be seen that as the cell walls expand and contract, due to oil from the cable being forced into the cells, or to oil flowing from the cells into the cable, the gas pressure in casing 1 acting on the cell walls will be increased and decreased due to the decrease and increase in the space occupied by the body of gas.

10 and 11 indicate insulated conductors of adjacent lengths of cable, and 12 the metal connector between the lengths. Each cable length is enclosed by an impervious enclosure or sheath 13 made of lead or an equivalent material.

14 indicates the reinforcing insulation which is applied after the conductors are united by the connector 12. Surrounding the joint thus formed is a casing 15, the outer ends of which are wiped jointed to the sheaths at 16. Inside of the casing are dams or stops 17 which prevent the free flow of liquid insulation from cable sheath into the chamber within the casing 15. These dams may be made in any suitable way, those shown comprising elastic material which snugly fit the outer covering on the conductors and also the inner wall of the casing 15. The pipe structure 5 on the reservoir is connected to the interior of the cable sheath by a conduit 18 containing a shut-off valve 19.

As before indicated, the reservoirs may be of a size greater than is required for a particular location. Where this is the case or where it is desired to change the gas volume for any particular location, the size or cubical contents of the gas chamber may be changed by pouring into the casing and outside of the cells a measured quantity of oil which to distinguish it from the oil in the cable and cells is referred to as "immersion" oil and is maintained entirely separate from the oil in the cable and in the cells. On the other hand, if the gas chamber is not large enough to accommodate the determined amount of gas required for a particular reservoir, some of the immersion oil can be drained off or, if no immersion oil, or an insufficient amount is present, the additional gas space can be easily provided for by connecting an auxiliary gas chamber to 20. In this connection, it may be said that the reservoirs commonly contain an initial limited amount of immersion oil as it has the additional advantage of reducing the tendency to deterioration of the parts. The oil may be introduced through the same filling means that is used for the gas or it may be introduced through an opening in the casing head 2, said opening being normally sealed by the plug 20.

As a general proposition, if the length of cable which is serviced by a reservoir is twice as long as another, the cell structure will contain twice as much oil and the volume of gas acting on the cells within the larger reservoir will be twice as great. The fact that the gas volume or the pressure of the gas, or both, within the reservoir may be readily adjusted, to fit differences in elevation, differences in lengths of cable, etc. makes the design of the reservoir practically universal. As a practical matter, it is preferable to make each reservoir casing a little larger than is necessary and to make the final adjustment by pouring in more or less immersion oil, although there may be cases where immersion oil can be dispensed with.

What I claim as new and desire to secure by Letters Patent of the United States, is:

1. A reservoir comprising a sealed casing having a gas containing chamber therein, a plurality of cells located in said gas chamber and displacing a corresponding volume of gas, each of the cells having elastic walls defining between them a chamber containing liquid insulation, conduit means connecting the cell chambers in such manner that liquid can simultaneously flow into and from them, and a body of gas in the casing chamber under a determined pressure which simultaneously acts on the walls of all the cells to establish an initial pressure and pressure range on the liquid within the cells greater than that due to the action of said walls.

2. A reservoir comprising a fluid tight casing having a gas containing chamber therein, a plurality of chambered cells located in said chamber each having elastic walls, all of said cell chambers containing liquid insulation, conduit means connecting the chambers of the cells so that liquid can simultaneously flow into and from them, means for positively limiting the outward and inward movements of the walls of the cells under increase and decrease of liquid pressure in the cell chambers, and a body of gas in the casing chamber under a determined pressure greater than that of the atmosphere which acts to simultaneously oppose the outward movements of the walls of all of the cells and raises the initial pressure and pressure range on the liquid within all of the cells.

3. A reservoir comprising a casing, a plurality of individual cells located within the casing, each comprising a pair of thin metal walls corrugated at their peripheral portions to increase their flexibility, and an annular member to which the peripheral edges of the walls are secured and held thereby in such spaced relation that the walls of one cell engage with those of adjacent cells to prevent injury when the internal pressure in the cell forces the walls outwardly, and means within each cell progressively acting on greater areas of the walls to support them as they are deflected inwardly due to external pressure thereon.

4. A reservoir comprising a casing, a plurality of individual cells located within the casing, each comprising a pair of thin metal walls corrugated at their peripheral portions to increase their flexibility, and a collar secured to the peripheral edges of the walls and holding them in spaced relation, said collars also acting to maintain the cells in such spaced relation that the walls of one cell will engage those of adjacent cells to afford mutual mechanical support when said cells are expanded, and wedge shaped means carried by the inner surface of the collar and so located as to form a mechanical support for the walls as they move toward each other, the area of contact of the support increasing as the walls move toward their collapsed position.

5. A reservoir comprising a supporting structure, a plurality of individual cells located within the structure, and arranged to form a stack and simultaneously receive and discharge liquid, each comprising a pair of thin metal walls corrugated near their peripheries to increase their flexibility and an annular member to which the peripheral edges of the walls of each said cell are secured, said cells being held in such spaced relation that the walls of one cell engage those of adjacent cells to prevent injury when the internal pressures within the several cells due to increased volume of liquid therein forces the walls thereof outwardly, the walls of each cell contacting in their central areas when the internal pressure is reduced below a predetermined minimum, and means for each cell acting to progressively support greater areas of the walls in the region of their peripheries and annular member as they are deflected due to change of internal pressure.

6. A variable pressure reservoir comprising a casing having rigid walls defining a sealed chamber of fixed cubical content, a plurality of cells located in the chamber and arranged in axial alignment to form a stack, each of the cells having elastic walls defining between them a chamber containing liquid insulation, conduit means connecting the cell chambers in such manner that liquid can simultaneously flow into and from them, said cells being arranged in such spaced relation that the central portions of adjacent cells contact over progressively greater areas as the volume of liquid in the cells increases, means for each cell acting to progressively support greater areas of the walls near the peripheries as they are deflected inwardly due to reduction of volume of liquid in the cell, and liquid and gas in determined amounts under pressure greater than that of the atmosphere within the chamber of the casing and acting on the outer surfaces of the walls of all of the cells to control the movements thereof, the pressure of the gas increasing and decreasing with changes in volume of the liquid within the cell chambers.

GEORGE B. SHANKLIN.